United States Patent
Lee et al.

(10) Patent No.: US 10,100,958 B2
(45) Date of Patent: Oct. 16, 2018

(54) GASKET FOR USE IN SEALING FLANGES TOGETHER

(71) Applicant: TRENDSETTER ENGINEERING, INC., Houston, TX (US)

(72) Inventors: Teng Pin Lee, Houston, TX (US); Kevin Poling, Houston, TX (US); Brent Cox, Houston, TX (US); David Older, Houston, TX (US)

(73) Assignee: TRENDSETTER ENGINEERING, INC., Houston, TX (US)

( * ) Notice: Subject to any disclaimer, the term of this patent is extended or adjusted under 35 U.S.C. 154(b) by 118 days.

(21) Appl. No.: 15/234,326

(22) Filed: Aug. 11, 2016

(65) Prior Publication Data
US 2018/0045347 A1  Feb. 15, 2018

(51) Int. Cl.
| F16L 23/20 | (2006.01) |
| F16J 15/08 | (2006.01) |
| F16L 17/08 | (2006.01) |
| F16J 15/48 | (2006.01) |
| F16L 23/032 | (2006.01) |

(52) U.S. Cl.
CPC .......... F16L 23/20 (2013.01); F16J 15/0887 (2013.01); F16J 15/48 (2013.01); F16L 17/08 (2013.01); F16L 23/032 (2013.01)

(58) Field of Classification Search
CPC ......... F16L 23/02; F16L 23/20; F16L 23/162; F16L 23/18; F16L 23/22
USPC .................. 277/644, 648, 649; 285/368, 336
See application file for complete search history.

(56) References Cited

U.S. PATENT DOCUMENTS

| 1,567,813 | A | * | 12/1925 | Oleson | F16L 17/08 277/614 |
| 1,819,036 | A | * | 8/1931 | Oberhuber | F16L 23/024 220/240 |
| 2,898,000 | A | * | 8/1959 | Hanny | F16J 15/0887 277/649 |
| 3,141,685 | A | * | 7/1964 | Watts | F16L 17/063 277/320 |
| 4,121,858 | A | * | 10/1978 | Schulz | F16L 23/18 285/13 |
| 4,168,852 | A | * | 9/1979 | Ahlstone | F16L 23/003 277/609 |
| 4,168,853 | A | * | 9/1979 | Ahlstone | F16L 23/003 277/609 |

(Continued)

FOREIGN PATENT DOCUMENTS

| EP | 1373766 | 1/2004 |
| WO | 1998021508 | 5/1998 |

*Primary Examiner* — Aaron M Dunwoody
(74) *Attorney, Agent, or Firm* — Egbert Law Offices, PLLC (57) ABSTRACT

A gasket for use with flanges has an annular member formed of a metallic material. The annular member has a cross-sectional profile with a body portion having an end surface, a first side, a second side, and a T-shaped portion extending from the body portion. The T-shaped portion of the body portion defines a pair of annular grooves on opposite sides of the annular member. The T-shaped portion has a central portion connected to the body portion and a head portion at an end of the central portion opposite the body portion. The central portion of the T-shaped portion has a weep hole extending therethrough. The weep hole has opposite ends opening respectively to the pair of annular grooves.

7 Claims, 3 Drawing Sheets

(56) References Cited

U.S. PATENT DOCUMENTS

| | | | |
|---|---|---|---|
| 4,272,109 A | 6/1981 | Ahlstone | |
| 4,294,477 A * | 10/1981 | Ahlstone | F16L 23/16 |
| | | | 277/609 |
| 4,410,186 A * | 10/1983 | Pierce, Jr. | F16L 23/20 |
| | | | 277/318 |
| 4,884,584 A | 12/1989 | Smith | |
| 5,355,908 A * | 10/1994 | Berger | F16L 15/001 |
| | | | 137/614.04 |
| 5,385,169 A | 1/1995 | Odelius | |
| 5,431,417 A * | 7/1995 | Dahlgren | F16L 23/20 |
| | | | 277/614 |
| 5,466,018 A * | 11/1995 | Stobbart | F16L 23/167 |
| | | | 277/614 |
| 5,839,765 A | 11/1998 | Carter et al. | |
| 5,887,876 A * | 3/1999 | Aldridge | F16L 19/0218 |
| | | | 277/609 |
| 6,722,426 B2 | 4/2004 | Sweeney et al. | |
| 7,004,470 B2 * | 2/2006 | Hystad | G01M 3/2853 |
| | | | 277/317 |
| 7,025,360 B2 | 4/2006 | Walker et al. | |
| 7,467,799 B1 | 12/2008 | Tarlton | |
| 7,819,439 B2 | 10/2010 | Paton et al. | |
| 8,096,560 B2 | 1/2012 | Pallini, Jr. et al. | |
| 8,205,916 B2 | 6/2012 | Dallas et al. | |
| 8,226,089 B2 | 7/2012 | Pallini, Jr. et al. | |
| 9,045,961 B2 * | 6/2015 | Melancon | E21B 33/06 |
| 9,222,609 B1 | 12/2015 | Lee | |
| 9,726,313 B2 * | 8/2017 | Haringstad | F16L 23/167 |
| 2004/0056432 A1 | 3/2004 | Walker et al. | |
| 2007/0013146 A1 | 1/2007 | Gariepy | |
| 2014/0246192 A1 * | 9/2014 | Guidry | E21B 33/068 |
| | | | 166/250.01 |

\* cited by examiner

GASKET FOR USE IN SEALING FLANGES TOGETHER

CROSS-REFERENCE TO RELATED APPLICATIONS

Not applicable.

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

INCORPORATION-BY-REFERENCE OF MATERIALS SUBMITTED ON A COMPACT DISC

Not applicable.

BACKGROUND OF THE INVENTION

1. Field of the Invention

The present invention relates to gaskets for use in sealing flanges together. More particularly, the present invention relates to metal-to-metal seals that are applied to the junctions between coupling elements or hubs. Additionally, the present invention relates to gaskets and seals that are used with a standard BX profile.

2. Description of Related Art Including Information Disclosed Under 37 CFR 1.97 and 37 CFR 1.98

Metal-to-metal sealing is commonly used in subsea hydrocarbon production assemblies. For example, subsea wells typically have a subsea wellhead assembly at the seafloor with a subsea production tree mounted on the wellhead assembly. The tree has valves connected to flow lines for controlling the flow from the well. In another type of installation, a string of tieback conduits extend from the subsea wellhead assembly to a platform at the surface. A surface tree is mounted on the upper end of the tieback conduit. Some riser systems have inner and outer tieback conduits, each of which is run separately and connected by a tieback connector. The inner and outer tieback conduits make up the tieback riser in that type of system. In each of these subsea connections, there is employed a first coupling element and a second coupling element. Typically, these coupling elements are referred to as flanges or hubs. The flanges are joined together with the seal positioned at the interface of the flanges so as to establish a strong liquid-tight connection therewith. The seal is preferably a metal-to-metal seal that seals to an internal component of the subsea wellhead housing assembly. Metal-to-metal seals have a variety of configurations.

The offshore oil and gas industry has standardized the use of ring gaskets so as to be designated as "RX" or "BX" by the API. In particular, this is described in the "API Specification from Wellhead Equipment" of the American Petroleum Institute.

The API Type "BX" ring gaskets is a pressure-energized ring and it is designed for face-to-face contact between hubs or flanges. When energized, the small contact bands between the outer diameter of the ring gasket and the ring groove is the sealing area. This ring gasket is slightly larger than the ring groove. Therefore, when the hubs or flanges are tightened, the gasket will be slightly compressed into the ring groove to seal pressure. Since this is a face-to-face contact type, the tolerance of the gasket and the ring is vital. As such, since the gasket at the high side of tolerance in the groove and the low side of tolerance, it would be difficult to achieve the face-to-face contact. The "BX" gasket is compatible for 6BX flanges and 16BX hubs or flanges.

Typical API6A and 6BX flanges are used to connect two pipe spools or blocks together to create a flow path. These flanges are used in a variety of surface and subsea equipment. The sealing element within the 6BX flange is described as a BX ring gasket that is roughly octagonal in shape. The ring gasket contains flat/conical faces near the corners of the octagonal shape that come into contact with a machined sealing group within the flange faces. These areas, when in contact with the sealing group of the flange, create the metal-to-metal seal when the fasteners joining the two flanges are tensioned. Type BX gaskets also have cross-sections which, when seen in profile, have eight sides. They have a pitch diameter slightly larger than the groove in which they fit. The diameter difference between gasket and grooves provides an additional sealing force by maintaining intimate contact with the outside diameter of the groove, even if the flanges move slightly away from each other under pressure.

In the past, various patents have issued relating to such ring gaskets. For example, U.S. Pat. No. 4,272,109, issued on Jun. 9, 1981 to A. G. Ahlstone, shows a ring gasket that is retained in position on a pipe connector flange with the ring gasket properly positioned for sealing engagement and loading between oppose circular grooves in the flange and a mating flange or member. The ring gasket is supported at its outer periphery by a member connected to one of the connector parts between opposed abutting surfaces of the connector parts when they are connected. The ring gasket is increased in size to compensate for the standoff so that the ring gasket is properly loaded. The ring gasket has peripheral, oppositely-tapered sealing surfaces loaded into sealing engagement with opposing companion surfaces forming the grooves in the flanges upon making up of the connection. The connection between the retaining means in the ring gasket permits axial movement of the ring gasket as is necessary to enable loading thereof.

U.S. Pat. No. 7,025,360, issued on Apr. 11, 2006 to Walker et al., discloses a metal seal with a corrosion-resistant alloy overlay. This metal seal provides for sealing between tubular members. First and second tubular members have first and second conical inner sealing surfaces. A metal sealing ring has corrosion-resistant inlays defining opposing conical outer sealing surfaces for sealing with the first and second conical inner sealing surfaces. The resulting composite sealing ring has the corrosion-resistant benefits of stainless steel at the sealing surfaces, along with the desired expansion ratio of a conventional carbon steel.

U.S. Pat. No. 8,205,916, issued on Jun. 26, 2012 to Dallas et al., describes a metal ring gasket to provide a high-pressure temperature tolerant metal-to-metal seal. The metal ring gasket is received in an annular cavity formed between mating surfaces. The metal ring gasket maintains a fluid seal at high temperatures. At high fluid pressures, the metal ring gasket is energized because of the stress induced by the fluid pressure that forces the metal ring gasket into tighter contact with subcomponents.

International Publication No. WO 1998021508, published on May 22, 1998 to M. R. Williams, describes a subsea wellhead sealing arrangement for uni-directional sealing between internal and external pressures so as to act respectively on the inside and outside of a connection between a first connection member and a second connection member. The first connection member and the second connection member each have a generally circular contact surface. The contact surface has an inside diameter and outside diameter. The first and second contact surfaces correspond and are engaged with each other. There is a generally ring-shaped primary seal adapted to be positioned within the inner diameter of the surface so as to form a seal to prevent leakage of internal pressure encompassed by the primary seal into the area outside of the primary seal between the first and second connection members. There is also a generally ring-shaped secondary barrier seal positioned concentrically around the primary seal between the first and second connection member contact surfaces to prevent entry of external pressure to the area encompassed by the secondary area seal between the first and second connection members. The secondary seal member is adapted to temporarily deflect when subjected to internal pressure encompassed therein that may have leaked past the primary seal in order to permit the internal pressure to pass to an area outside the secondary barrier seal.

U.S. Pat. No. 9,222,609, issued on Dec. 29, 2015 to the present inventor, shows a seal for use with a first coupling element and a second coupling element. The seal has an annular configuration. The seal has an inner wall and an outer wheel. The seal has a first portion, a central portion and a second portion. The central portion extends outwardly of the first portion and the second portion. A channel is formed in the central portion so as to have one end opening to the outer wall at the first portion and an opposite end opening to the outer wall at the second portion. The seal is formed of a metallic material. The outer wall at the central portion has a generally V-shaped configuration.

In the past, various patents have issued relating to such metal-to-metal seals and relating to subsea coupling sealing connections. For example, U.S. Pat. No. 4,884,584, issued on Dec. 5, 1989 to R. E. Smith, describes a coupling having a metal-to-metal seal formed between a male member and a female member. The seal is pre-loaded by means of an internal preload mechanism. The male member engages the seal member so as to form the sealing relation between the two. The seal members are allowed to float, or slide, longitudinally within the bore of the female coupling member between an extended position and a compressed position. The seal member is biased by the preload mechanism into the extended position.

U.S. Pat. No. 5,385,169, issued on Jan. 31, 1995 to O. D. Odelius, describes a subsea fluid coupling employing metal-to-metal sealing. The subsea fluid coupling includes male and female parts which can be quickly connected and disconnected. The metal seals are carried by the female and male parts and engage planar metal surfaces to produce metal-to-metal sealing around the first and second passages when the coupling is connected or disconnected. Holes extend laterally through the gate and the conduit body, respectively, for creating a lateral pressure balance on the gate and conduit body.

U.S. Pat. No. 5,839,765, issued on Nov. 24, 1998 to Carter et al., discloses a metal seal ring for a tubular joint. The tubular joint has end hubs in opposed relationship and secured by a clamp. A primary seal ring has external tapered sealing surfaces engaging internal tapered sealing surfaces on the hubs to provide a primary seal. Secondary sealing surfaces on the hubs are engaged by O-rings to seal against external fluid flow to the seal ring. O-rings permit internal fluid flow outwardly from the seal ring.

U.S. Pat. No. 6,722,426, issued on Apr. 20, 2004 to Sweeney et al., teaches a gasket with multiple sealing surfaces. This gasket is a metal seal for a wellhead assembly that has upper and lower legs extending in opposite directions from each other and a rib extending radially outward from a junction of the legs. A first conical band on the upper leg extends uninterrupted from the rib a selected distance toward a tip of the upper leg. A second conical band on the upper leg extends uninterrupted from the tip of the upper leg toward the first conical band. An annular recess is located between the first and second conical bands.

U.S. Pat. No. 7,467,799, issued on Dec. 23, 2008 to O. D. Tarlton, provides a composite metal-to-metal seal having a core of relatively soft metal and an annular region of relatively soft metal. The seal is a ring having a pair of annular regions which provide tapered annular sealing surfaces for engaging respective sealing surfaces of mating hubs.

U.S. Pat. No. 7,819,439, issued on Oct. 26, 2010 to Paton et al., shows a fishtail bore seal. This bore seal serves to connect oil and gas tubular members. The bore seal has a fishtail profile which facilitates the use of resilient seals to provide resistance to external pressures in addition to the traditional metal-to-metal seal between the bore seal and the tubular members. A pressure relief valve is disposed within the bore seal to verify the integrity of the metal-to-metal seal with respect to internal bore pressure.

U.S. Pat. No. 8,096,560, issued on Jan. 17, 2012 to Pallini, Jr. et al., provides a metal-to-metal seal for a smooth bore for sealing contact with an opposing surfaces. The seal assembly includes an annular seal body with a sealing surface on one side of the seal body. An end of the sealing surface includes a sealing face for sealing contact with the opposing surface. The sealing surface also includes at least one support point that contacts the opposing surface when the seal is placed in sealing contact.

U.S. Pat. No. 8,226,089, issued on Jul. 24, 2012 to Pallini, Jr. et al., provides a seal assembly includes a tubular member having a longitudinal axis and a tubular member seal profile. A metal seal ring has a proximal base and a distal end that has a seal ring seal profile between the proximal base and distal end so as to contact the seal profile of the tubular member. A distal annular recess is in one of the seal profiles. The distal annular recess is spaced axially from the distal end of the seal ring so as to define a seal surface between the distal end of the seal ring and the distal annular recess that engages a seal surface of the seal profile of the tubular member. A proximal annular recess in one of the seal profiles is spaced axially from the distal annular recess so as to define a support area axially spaced from the metal-to-metal seal area.

European Patent No. 1373766, published on Jan. 2, 2004 to C. N. Crawford, describes an annular metal-to-metal sealing system which has a metal member defining an annular internal or external sealing surface. The annular seal body is composed of a high-strength metal material which is positioned in concentric relationship with the annular sealing surface and is sufficiently flexible to become spring-loaded during assembly. The annular seal body defines one or more annular seal retainer grooves each having an annular soft metal sealing inset therein with a portion thereof exposed for sealing engagement with the annular sealing surface. The spring-loaded characteristic of the annular seal body applies constant force to maintain the soft metal seal insert constantly energized sealing relation with the annular sealing surface.

U.S. Patent Publication No. 2004/0056432, published on Mar. 25, 2004 to Walker et al., provides a composite metal sealing ring for sealing between tubular members. Each of the tubular members has first and second conical inner sealing surfaces. A metal sealing ring has corrosion-resistant inlays defining opposing conical outer sealing surfaces for sealing with the first and second conical inner sealing surfaces.

U.S. Patent Publication No. 2007/0013146, published on Jan. 18, 2007 to J. A. Gariepy, shows a sealing ring for providing for sealing between truncated conical surfaces of adjoining members. The sealing ring includes an annular metal seal body having first and second truncated conical surfaces each for planar engagement with a truncated conical surface on a respective member. The annular sealing ring insert has a radially inward recess in the respective truncated conical body.

It is an object of the present invention to provide a gasket that is able to fit into a standard BX profile.

It is another object of the present invention to provide a gasket that assists in the alignment of flanges.

It is another object of the present invention to provide a gasket the limits distortion of the gasket under high pressures.

It is another object of the present invention provide a gasket that prevents pressure buildup within the center cavity of the seal.

It is another object of the present invention to provide a gasket that provides a metal-to-metal seal.

It is still a further object of the present invention provide a gasket that requires no modification of the ring groove into which it is received.

It is still a further object of the present invention to provide a gasket that has an enhanced strength.

These and other objects and advantages of the present invention will become apparent from a reading of the attached specification and appended claims.

BRIEF SUMMARY OF THE INVENTION

The present invention is a gasket for use with flanges. The gasket comprises an annular member formed of a metallic material. The annular member has a cross-sectional profile that comprises a body portion and a T-shaped portion. The body portion has an end surface, a first side and a second side. The T-shaped portion extends from the body portion. The T-shaped portion and the body portion define a pair of annular grooves on opposite sides of the annular member. The T-shaped portion has a central portion connected to the body portion and a head portion at an end of the central portion opposite the body portion.

The central portion of the T-shaped portion has a weep hole extending therethrough. The weep hole has opposite ends opening respectively to the pair of annular grooves. The head portion of the T-shaped portion also has a weep hole with one end opening to a surface thereof. This weep hole extends so as to have another end communicating with at least one of the pair of annular grooves. In particular, the weep hole in the head portion of the T-shaped portion has another end opening to the weep hole in the central portion.

The end surface of the body portion comprises a planar surface, a first angled surface extending at an obtuse angle from one end of the planar surface, and a second angle surface extending at an obtuse angle from an opposite end of the planar surface. The first side of the body portion extends from an end of the first angled surface opposite the planar surface and extends in transverse relation to the planar surface. The second side of the body portion extends from an end of the second angled surface opposite the planar surface. The second side of the body portion extends in transverse relation to the planar surface and extends in parallel relation to the first side.

The head portion of the T-shaped portion is positioned nearer an annulus or flow pathway of the flange than the body portion of the annular member. The head portion of the T-shaped portion comprises a planar surface, a first angled surface extending in an obtuse angle from one end of the planar surface, and a second angled surface extending an obtuse angle from an opposite end of the planar surface. The first angled surface of the head portion has a first curved end opposite the planar surface. The curved end extends inwardly toward one of the pair of annular grooves. The second angled surface has a second curved end extending inwardly toward another of the pair of annular grooves. The central portion of the T-shaped portion has a thickness less than a width of the body portion and less than a width of the head portion.

The present invention is also a connection apparatus that comprises a first pipe having a first flow path, a second pipe having a second flow path, a first flange affixed to an end of first pipe and having a face with a first ring groove formed therein, a second flange affixed to an end of the second pipe and having a face with a second ring groove formed therein, and an annular gasket received in the first and second ring grooves. The annular gasket has a cross-sectional profile that comprises a body portion having an end surface, a first side and a second side, and a T-shaped portion extending from the body portion. The T-shaped portion of the body portion defines a pair of annular grooves on opposite sides of the annular member. The T-shaped portion has a central portion connected to the body portion at a head portion at an end of the central portion opposite the body portion. The face of the first flange is in liquid-tight sealing relation with the face of the second flange.

The first ring groove has an inner wall nearer to the first flow path than an outer wall of the first ring groove. The second ring groove has an inner wall nearer to the second flow path than an outer wall of the second ring groove. The head portion of the annular gasket is positioned against the inner walls of the first and second ring grooves. The body portion has an end surface positioned against the outer walls of the first and second ring grooves.

The annular gasket is formed of a metallic material. The annular gasket has a configuration described herein previously.

This Section is intended to describe, in particularity, the preferred embodiments of the present invention. It is understood that modifications to this preferred embodiment can be made within the scope of the present claims. As such, this Section should not to be construed, in any way, as limiting of the broad scope of the present invention. The present invention should only be limited by the following claims and their legal equivalents.

DETAILED DESCRIPTION OF THE INVENTION

Figure 1:
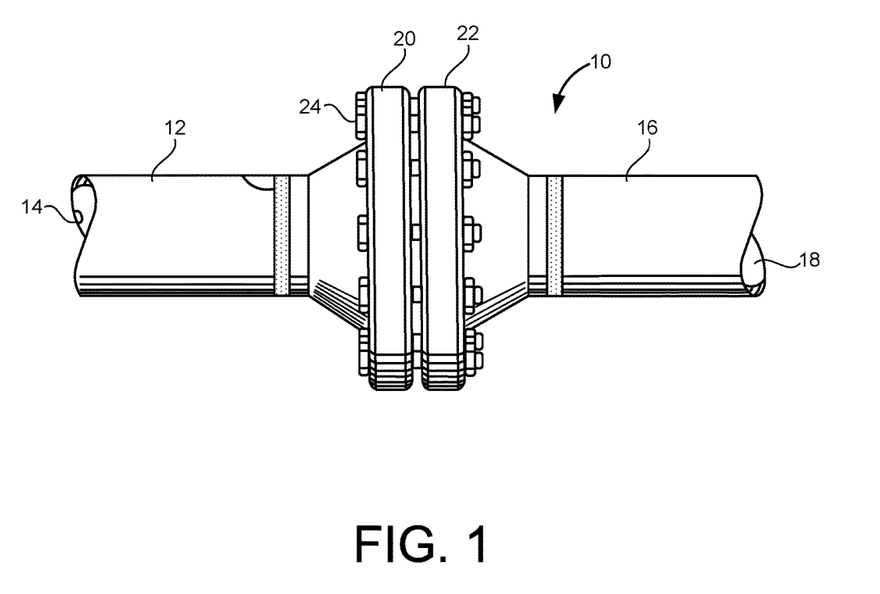
FIG. 1 is a side elevational view showing a flange connection between a pair of pipes.

Referring to FIG. 1, there is shown the connection apparatus 10 in accordance with the present invention. The connection apparatus 10 includes a first pipe 12 having a first flow path 14 therein. A second pipe 16 has a second flow path 18 therein. A first flange 20 is affixed to an end of the first pipe 12. As will be described hereinafter, the first flange 20 will have a face with an ring groove formed therein. This ring groove is a BX ring groove. A second flange 22 is affixed to an end of the second pipe 16. The second flange 22 also has a face with a second ring groove formed therein. As will be described hereinafter, an annular gasket is received in the first and second ring grooves.

In FIG. 1, there are a plurality of bolts 24 that extend through the respective holes in the first flange 20 in the second flange 22 so as to affix the flanges 20 and 22 together such that the faces thereof are in a liquid-tight sealing relationship. In particular, in the present invention, there will be a metal-to-metal seal between the faces of the flanges 20 and 22. The flow paths 14 and 18 will be axially aligned with each other.

Figure 2:
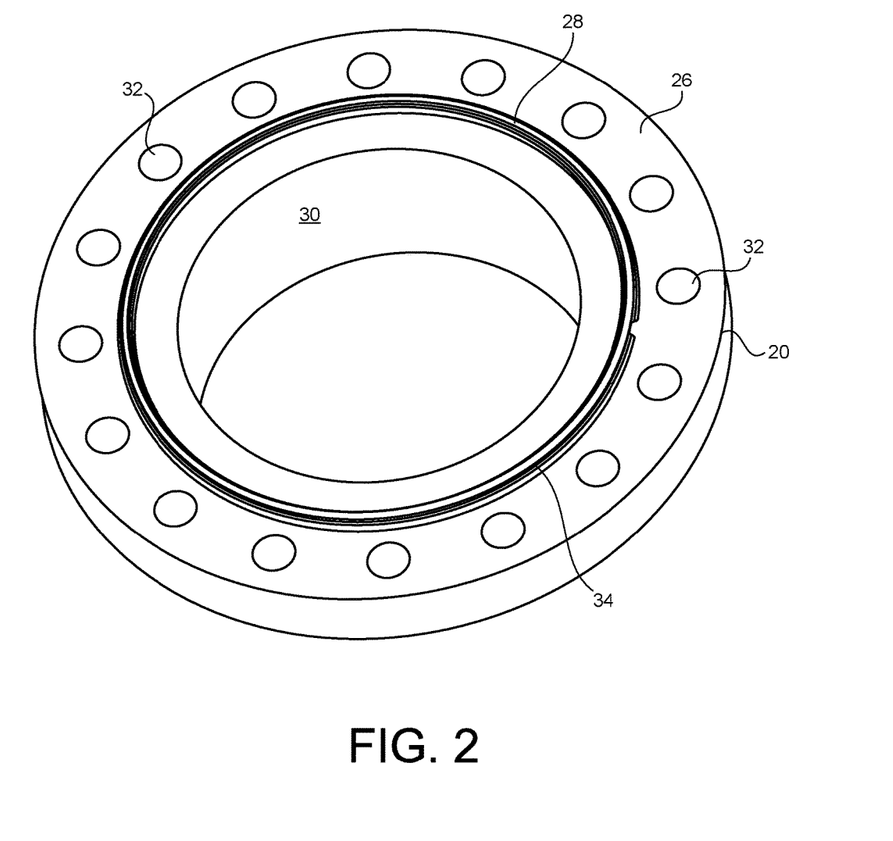
FIG. 2 a perspective view of a flange of a face of the flange having a BX ring groove formed therein.

FIG. 2 shows a face 26 of the first flange 20. The face 26 has a ring groove 28 formed therearound. This ring groove will be adjacent to the inner wall 30 of the flange 20 which faces the flow path 14. A plurality of holes 32 are formed through the thickness of the first flange 20. Holes 32 allow the bolts 24 to be received therein. In normal use, the face 26 of the first flange 20 will bear against the face of the second flange 22. The second flange 22 will have an identical configuration to that of the first flange 20. As such, the holes of the second flange 22 will align with the holes 32 of the first flange 20 so that the bolts 24 can be inserted therethrough. In this configuration, the ring groove 28 of the first flange 20 will mate with a corresponding half of the ring groove in the second flange 22. The gasket 34 of the present invention is received within this ring groove 28. The gasket will have a portion extending so as to be correspondingly received by the ring groove associated with the second flange 22.

Figure 3:
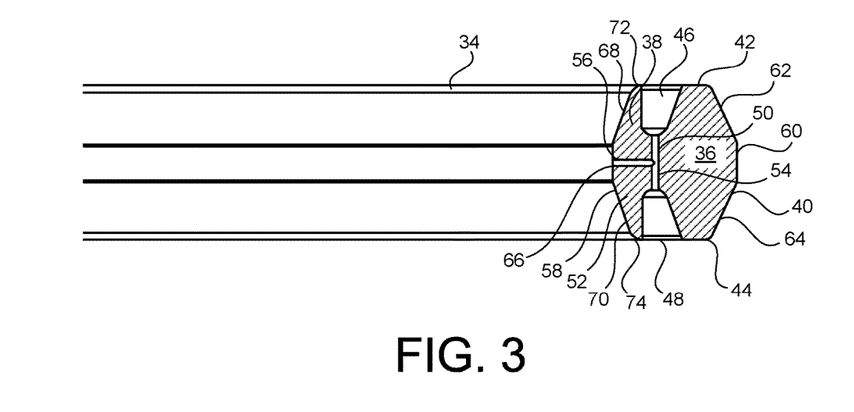
FIG. 3 is a perspective view of the gasket of the present invention.

FIG. 3 shows the gasket 34 of the present invention. The gasket 34 is an annular gasket formed of a metallic material. The gasket 34 is received within the ring grooves associated with flanges 20 and 22 in the manner to be described hereinafter. The gasket 34 has a cross-sectional profile which includes a body portion 36 and a T-shaped portion 38. The body portion 36 has an end surface 40, a first side 42 and a second side 44. The T-shaped portion 38 extends from the body portion 36. It can be seen that the T-shaped portion 38 and the body portion 36 define a pair of annular grooves 46 and 48 on opposite sides of the gasket 34. The T-shaped portion 38 has a central portion 50 and a head portion 52 at an end of the central portion 50 opposite the body portion 36.

The central portion 50 of the T-shaped 38 has a weep hole 54 extending therethrough. The weep hole 54 has opposite ends opening respectively to the pair of annular grooves 46 and 48. The head portion 52 of the T-shaped portion 38 has another weep hole 56 having one end opening to the outer surface 58 of the T-shaped portion 38. The weep hole 56 extends to have another end communicating with at least one of the pair of annular grooves 46 and 48. In particular, the weep hole 56 extends so as to have an end opening to the weep hole 50 in the central portion.

The end surface 40 of the body portion 36 includes a planar surface 60, a first angled surface 62 and a second angled surface 64. The first angled surface 62 extends at an obtuse angle from one end of the planar surface 60. The second angled surface 64 extends at an obtuse angle from an opposite end of the planar surface 60.

The first side 42 of the body portion 36 extends from an end of the first angled surface 62 and extends in transverse relationship to the planar surface 60. The second side 44 of the body portion 36 extends from an end of the second angled surface 64 opposite the planar surface 60. The second side 44 of the body portion extends in transverse relationship to the planar surface 60 and extends a generally parallel relationship to the first side 42.

In normal use, the head portion 38 of the T-shaped portion 50 is nearer an annulus of the flanges 20 and 22 than the body portion 36.

The head portion 38 of the T-shaped portion 50 has a planar surface 66, a first angled surface 68 and a second angled surface 70. The first angled surface 68 extends at an obtuse angle from one end of the planar surface 66. The second angled surface 70 extends at an obtuse angle from an opposite end of the planar surface 66. The first angled surface 68 of the head portion 38 has a curved end 72 opposite the planar surface 66. This curved end extends inwardly toward the annular groove 46. The second angled surface 70 has a second curved end 74 extend inwardly toward the annular groove 48. It can be seen in FIG. 3 that the central portion 50 of the T-shaped portion 38 has a thickness less than a width of the body portion 36 and less than a width of the head portion 38.

Figure 4:
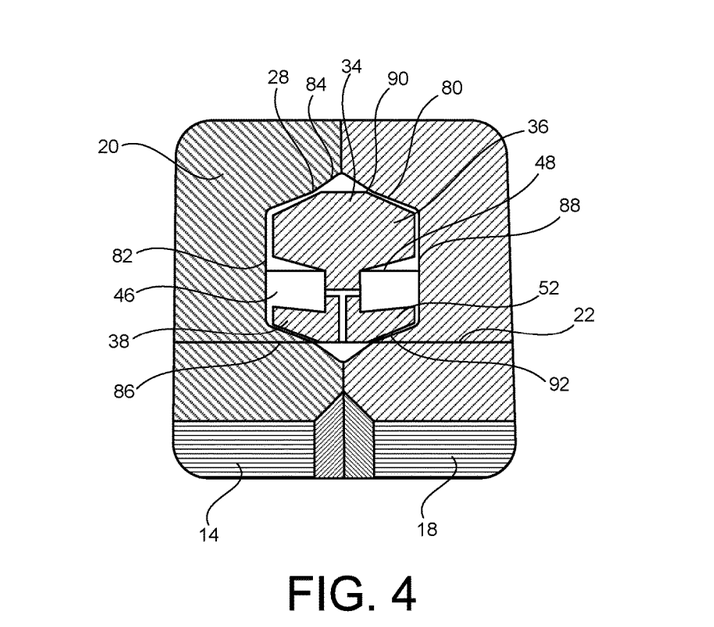
FIG. 4 is a cross-sectional view of the gasket of the present invention as positioned between a pair of flanges.

FIG. 4 shows the gasket 34 of the present invention as installed within the ring grooves 28 and 80 of the respective flanges 20 and 22. It can be seen that the flow paths 14 and 18 are aligned with each other and meet at the juncture of the faces of the respective flanges 20 and 22. In particular, the ring groove 28 includes a first surface 82 which extends in transverse relationship to the flow paths 14 and 18. A second surface 84 which extends at an obtuse angle from the first surface 82 and a second surface 86 which extends at an obtuse angle from an opposite end of the first surface 82. Similarly, the ring groove 80 includes a fourth surface 88 which extends in transverse relationship to the flow paths 14 and 18, a fifth surface 90 and a sixth surface 92 which extend at an obtuse angle from opposite ends of the fourth surface 88.

The gasket 34 includes the body portion 36 and the head portion 52. For purposes of clarity, each of the particular surfaces of the gasket 34 that is been referred to is shown numerically in FIG. 3.

In FIG. 4, it can be seen that the head portion 52 of the T-shaped portion 38 is positioned within the ring grooves 28 in a location closer to the flow paths 14 and 18 than does the body portion 38. The angled surfaces 68 and 70 of the head portion 52 generally reside against the second angled surface 86 and the sixth angled surface 92. The planar surface 66 will be located so as to overlie the junction between the flanges 20 and 22. As such, the weep hole 56 will have its opening facing the area of the junction between the flanges 20 and 22. The weep hole 50 communicates with the weep hole 56 so as to open to the annular grooves 46 and 48. As such, an annular pocket will generally be formed between the inner walls of the ring grooves and the outer surfaces of the gasket 38.

The side 42 will generally be positioned adjacent to first surface 82. The side 44 will be adjacent to the fifth surface 88. The angled surfaces 62 and 64 will bear against the first surface 84 and the fourth surface 90.

As can be seen in FIG. 4, if the high-pressure fluid flowing through the pathways 14 and 18 should create such a high-pressure as to separate the faces of the respective flanges 20 and 22, a leakage can occur. This leakage would flow through the separated faces of the flanges 20 and 22 and enter into the ring grooves 28 and 80. Importantly, in the present invention, in the event this should occur, this high-pressure fluid with flow through the weep hole 56 and into the weep hole 50. Therefrom, it would pass into the areas of the annular grooves 46 and 48. Ultimately, this high-pressure fluid would flow this area within the ring grooves so as to exert pressure against the back faces of the head 52 of the T-shaped portion 38 so as to urge the respective angled surfaces 68 and 70 into strong sealing engagement with the respective third surface 86 and the sixth surface 92 of the respective ring grooves. Additionally, this force would urge against the inside walls of the gasket 38 defined by the surfaces of the body portion 34 at the pockets 46 and 48. Once again, this pressure would urge the surfaces of the body portion against the interior surfaces of the ring grooves so as to further enhance the sealing effect. As such, the force of a fluid flowing through the weep hole 50 and into the weep hole 56 and into the annular grooves 46 and 48 will further establish a secondary or back-up sealing relationship. As such, no loss in pressure within the flow paths 14 and 18 will occur. The flow of fluid through these weep hole will enhance the pressure at the pressure points between the surfaces of the gasket 34 and the walls of the ring groove so as to establish a strong seal therewith. As such, there will be no leakage of fluid or loss of pressure at the interface between the flanges 20 and 22. Similarly, if the seal between the head portion 52 and the walls of the ring groove should be breached, then the flow will exert pressures onto the body portion of the gasket 34. Once again, this would establish a strong sealing relationship between the surfaces of the body portion 36 and the walls of the ring groove. This further establishes a strong sealing relationship.

The gasket 34 of the present invention fits to the standard machines ring grooves as defined in API 6A specification. The gasket 34 incorporates spherical sealing profiles to contact the machines sealing profile groove within the flanges. The sealing surfaces are robust to withstand internal pressure and temperature. The same sealing surfaces are robust to withstand external pressure to prevent the subsea environment from entering the flow path.

The gasket 34 the present invention is especially designed to fit within the standard BX profile. One key aspect of the gasket 34 of the present invention is its ability to assist in the alignment of flanges. Typical metal-to-metal seals of this nature require the mating flanges to be closely aligned prior to final makeup. The gasket 34 uses the T-shaped portion 38 to assist in the alignment of the flanges. This T-shaped portion is located closer to the flow path than the sealing face of the gasket. The central portion 50 of this T-shaped portion 38 operates as a strength member to allow for high-pressure sealing so as to limit the distortion of the gasket.

The gasket 34 of the present invention incorporates the weep holes 54 and 56 to prevent pressure build-up within the center cavity of the seal and to force sealing to occur on the outer diameter seal profiles of the gasket.

The gasket 34 of the present invention creates a metal-to-metal seal with a standard BX groove profile. No modification of the ring groove is needed. The gasket 34 uses a spherical or toroidal seal surface to enact the metal-to-metal seal. The weep holes prevent pressure build-up above the retained internal bore pressure. If sealing were to occur at the outer diameter surfaces and the inner diameter surfaces, the groove cavity pressure would greatly exceed the retained bore pressure and could damage the gasket and/or grooves. The weep holes force sealing to occur on the outer diameter of the gasket in correspondence with the profile of the BX groove. The interior T-shaped portion provides the strength to the gasket and helps energize the sealing function. The T-shaped portion enhances the gasket/flange alignment capabilities. This T-shaped portion also provides reinforcement for external pressure. The spherical or toroidal seal surfaces provides a consistent sealing band. The spherical or toroidal seal surfaces always tend to contact on the same surface band where there is relative movement between the flanges. The gasket 34 of the present invention requires a lower setting force than conventional BX gaskets. The gasket 34 is properly scalable to cover all standard BX ring grooves. The gasket utilizes higher strength materials to allow greater elastic resiliency of the gasket. The contact geometry accommodates the higher gasket strength with less damage to the ring groove sealing surface than a standard BX gaskets.

The foregoing disclosure and description of the invention is illustrative and explanatory thereof. Various changes in the details of the illustrated construction can be made within the scope of the appended claims without departing from the true spirit of the invention. The present invention should only be limited by the following claims and their legal equivalents.

We claim:

1. An apparatus comprising:
a first pipe having a first flow path;
a second pipe having a second flow path;
a first flange affixed to an end of said first pipe, said first flange having a face with a first sealing groove formed therein;
a second flange affixed to an end of said second pipe, said second flange having a face with a second sealing groove formed therein; and
an annular gasket received in said first and second sealing grooves, said annular gasket having a cross-sectional profile comprising:
a body portion having an end surface and a first side and a second side; and
a T-shaped portion extending from said body portion, said T-shaped portion and said body portion defining a pair of annular grooves on opposite sides of said annular gasket, said T-shaped portion having a central portion connected to said body portion and a head portion at an end of said central portion opposite said body portion, said face of said first flange being liquid-tight sealing relationship with said face of said second flange, said central portion of said T-shaped portion having a weep hole extending therethrough, said weep hole having opposite ends ending respectively to said pair of annular grooves, said head portion of said T-shaped portion having another weep hole with one end opening to a surface thereof, said another weep hole having another end opening to said weep hole in said central portion, said head portion of said T-shaped portion comprising:
a planar surface;
a first angled surface extending at an obtuse angle from one end of said planar surface; and a second angled surface extending at an obtuse angle from an opposite end of said planar surface.

2. The apparatus of claim 1, said first sealing groove having an inner wall nearer to said first flow path than an outer wall of said first sealing groove, said second sealing groove having an inner wall nearer to said second flow path than an outer wall of said second sealing groove, said head portion of said annular gasket positioned against the inner walls of said first and second sealing grooves.

3. The apparatus of claim 2, said body portion having an end surface positioned against the outer walls of said first and second sealing grooves.

4. The apparatus of claim 1, said annular gasket formed of a metallic material.

5. The apparatus of claim 1, said end surface of said body portion comprising:
   a planar surface;
   a first angled surface extending at an obtuse angle from one end of said planar surface; and
   a second angled surface extending at an obtuse angle from an opposite end of said planar surface.

6. The apparatus of claim 5, said first side of said body portion extending from an end of said first angled surface opposite said planar surface and extending in transverse relation to said planar surface, said second side of said body portion extending from an end of said second angled surface opposite said planar surface, said second side of said body portion extending in transverse relation to said planar surface and extending in parallel relation to said first side.

7. The apparatus of claim 1, said first angled surface of said head portion having a first curved end opposite said planar surface, said first curved end extending inwardly toward one of said pair of annular grooves, said second angled surface having a second curved end extending inwardly toward another of said pair of annular grooves.

* * * * *